(No Model.)

R. L. DOWNTON.
BOLTING REEL.

No. 322,358. Patented July 14, 1885.

Attest:
Charles Pickles
Geo. S. Wheelock

Inventor:
Rob't L. Downton
By Knight Bros
attys

UNITED STATES PATENT OFFICE.

ROBERT L. DOWNTON, OF ST. LOUIS, MISSOURI.

BOLTING-REEL.

SPECIFICATION forming part of Letters Patent No. 322,358, dated July 14, 1885.

Application filed April 9, 1884. (No model.)

*To all whom it may concern:*

Be it known that I, ROBERT L. DOWNTON, of St. Louis, Missouri, have invented a certain new and useful Improvement in Bolting-Reels, of which the following is a full, clear, and exact description, reference being had to the accompanying drawings, forming part of this specification, in which—

Figure 1:
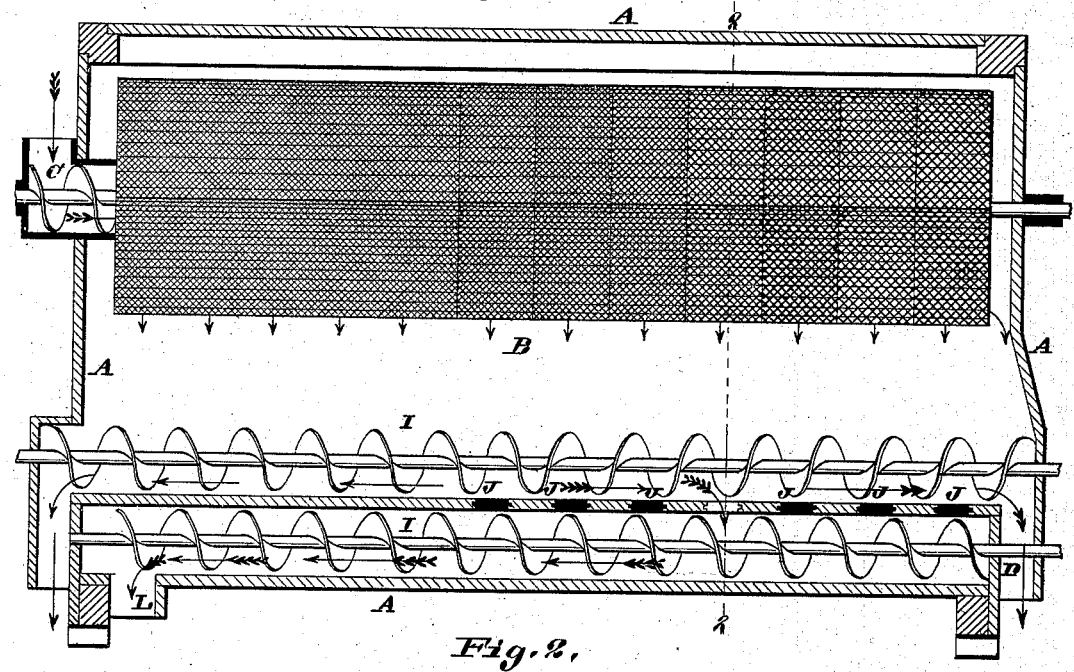
Figure 2:
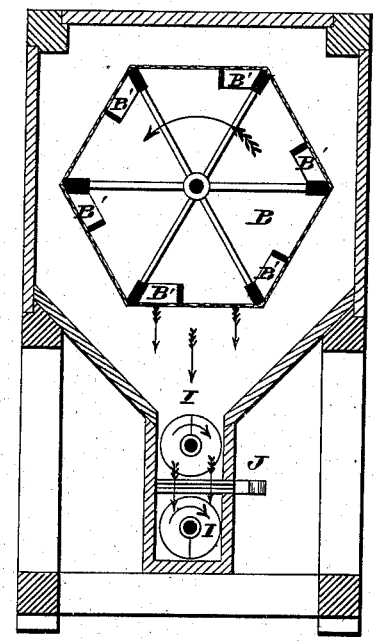

Figure 1 is a vertical longitudinal section taken on line 1 1, Fig. 2, and Fig. 2 is a transverse vertical section taken on line 2 2, Fig. 1.

My invention relates to those reels for bolting flour that are covered with cloth of different degrees of coarseness, beneath which is a right-and-left-screw conveyer, and beneath this conveyer another is located, to which the material is admitted from the conveyer above at any desired point by means of a series of valves. Reels of this class are found in Patents No. 129,611, issued July 16, 1872, to David Speck; No. 210,102, issued to Giles S. Cranson, November 19, 1878, and No. 107,035, issued to John Mallin, October 4, 1870.

My invention consists in a reel the receiving end or portion of which is covered with fine cloth, and the other portion of which is covered with cloth of progressive degrees of coarseness, in combination with a conveyer having a right-and-left screw located beneath the bolt, one portion of the screw—that is, the right or left portion—being under the portion of the reel that is covered with the cloth of uniform grade, which conveys the fine flour to the head of the reel, and the other part or portion of the screw being under the portion of the reel that is covered with cloth of progressive degrees of coarseness, and which conveys the material that falls through this part of the reel toward the tail, where it is discharged, unless, before reaching the end of the screw, it is dropped to a conveyer which carries it through a spout, all as hereinafter described and claimed.

Referring to the drawings, A represents the frame or housing of the apparatus, in the upper part of which is supported the reel B, driven or turned by suitable means and fed by a conveyer, C, or other well-known means. The head part or front of the reel is covered with fine cloth, suitable for taking out flour fit for the trade, and the tail part or portion is covered with cloth of progressive degrees of coarseness, suitable for allowing the passage of flour and material sufficiently reduced to pass, as shown in Fig. 1. Beneath the reel, extending its full length, is a conveyer, I, having a right-and-left screw, one part of which—that is, the right or else the left part—is beneath the part of the reel covered by the fine cloth of uniform grade, and conveys the clean fine flour that falls through this part of the reel toward the head, where it is discharged through a spout, as shown in Fig. 1, and the other part of the screw is beneath the part of the reel that is covered with cloth of progressive degrees of coarseness, and conveys the coarse flour toward the tail of the reel, where it is discharged through a spout, D, through which the tail of the reel also discharges, as shown. Flour of different degrees of coarseness will be discharged through the tail portion of the reel, which may all be discharged through the spout D, or, as is common practice, may be cut off at any desired point and dropped into a second conveyer, I, by which it is carried back and discharged through a spout, L. The material that is too coarse to pass through the coarsest cloth of the reel is discharged from the tail into the spout D, as stated.

The reel may be inclined, to cause the material to move toward its tail, as is often done; or it may be provided, as shown in Fig. 2, with diagonal bars or plates B', by which the material is carried up and advanced.

I do not make claim as inventor to anything shown and described in the above-mentioned patents; but

What I claim as new and of my invention, and desire to secure by Letters Patent, is—

1. A bolting-reel covered with fine cloth suitable for dressing flour at its head part or portion, and covered at its tail or rear portion with cloth of progressive degrees of coarseness suitable for allowing the passage through the meshes of the cloth of material not sufficiently reduced, in combination with a conveyer having a right-and-left screw, one part of the screw being beneath the part of the reel that is covered with fine cloth, to move the fine flour toward the head of the reel, and the other part of the screw being beneath the portion of the reel that is covered with cloth of progressive degrees of coarseness, to move the coarse flour toward the tail of the reel, substantially as set forth.

2. A bolting-reel covered with fine cloth at its head part or portion, and covered at its tail or rear portion with cloth of progressive degrees of coarseness, in combination with a conveyer having a right-and-left screw, one part of the screw being beneath the part of the reel that is covered with fine cloth, to move the fine flour toward the head of the reel, and the other part of the screw being beneath the portion of the reel that is covered with cloth of progressive degrees of coarseness, to move the coarse flour toward the tail of the reel, and a second conveyer beneath and separated therefrom by a partition provided with valves or slides beneath the part of the upper screw that conveys toward the tail of the reel, said valves permitting a discharge of the coarse flour from the upper conveyer to the lower at any desired point, from where it is moved by the lower conveyer toward the head of the reel, substantially as set forth.

ROBERT L. DOWNTON.

In presence of—
GEO. H. KNIGHT,
SAML. KNIGHT.